Figure 1:
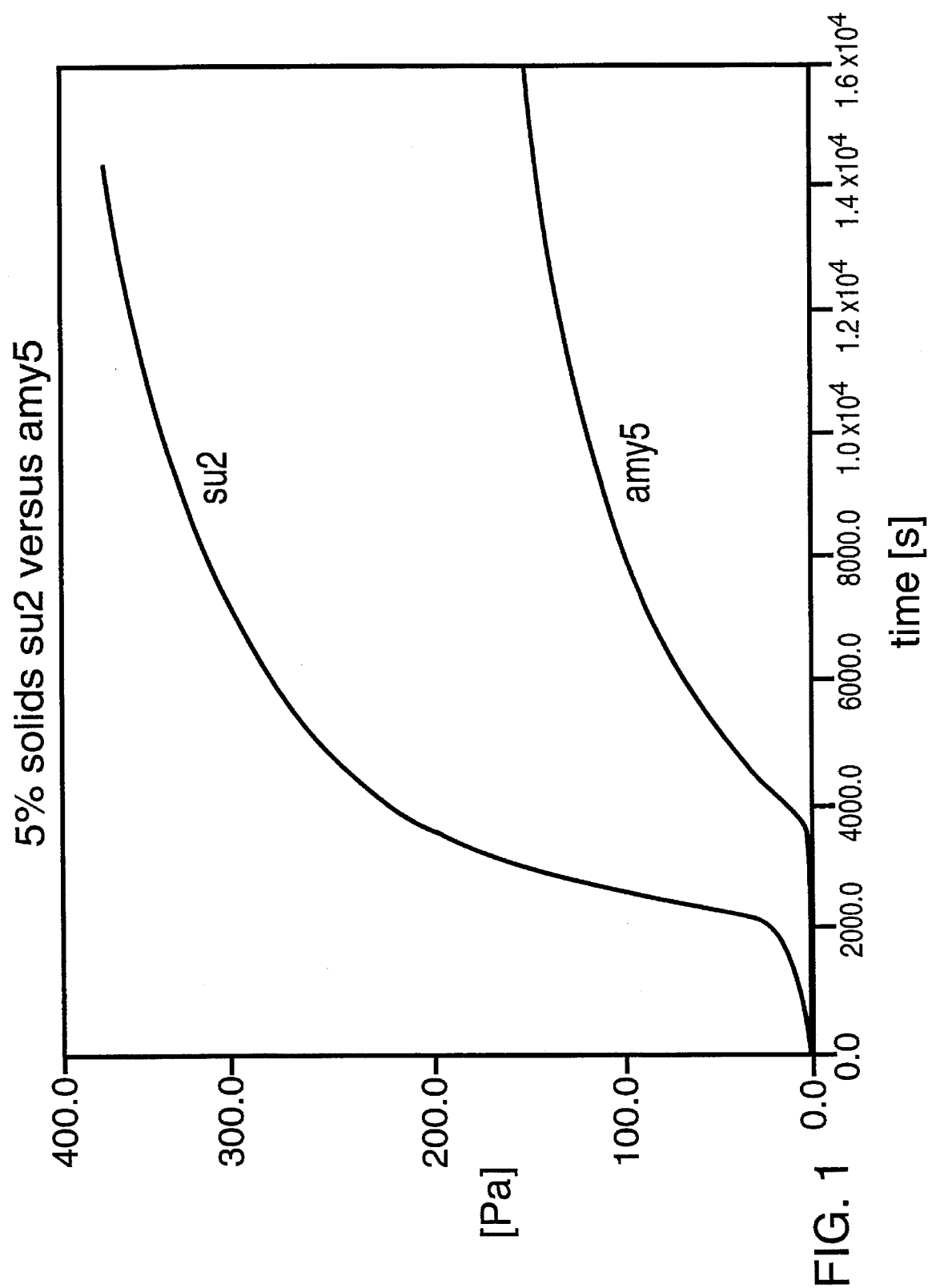

United States Patent [19]
Friedman et al.

[11] Patent Number: 5,476,674
[45] Date of Patent: Dec. 19, 1995

[54] FOODSTUFFS CONTAINING SUGARY-2 STARCH

[75] Inventors: Robert Friedman; Richard Hauber, both of Chicago, Ill.; Frances Katz, Crown Point, Ind.

[73] Assignee: American Maize Technology, Inc., Dimmitt, Tex.

[21] Appl. No.: 223,518

[22] Filed: Apr. 5, 1994

[51] Int. Cl.$^6$ .................................. A23L 1/0522
[52] U.S. Cl. ..................... 426/552; 426/397; 426/578; 426/661
[58] Field of Search .................... 426/658, 578, 426/552, 397, 661

[56] References Cited

U.S. PATENT DOCUMENTS

| | | |
|---|---|---|
| 4,120,983 | 10/1978 | delValle et al. . |
| 4,428,972 | 1/1984 | Wurzburg et al. . |
| 4,615,888 | 10/1986 | Zallie et al. . |
| 4,792,458 | 12/1988 | Friedman et al. . |
| 4,798,735 | 1/1989 | Friedman et al. . |
| 5,356,655 | 10/1994 | White et al. . |

OTHER PUBLICATIONS

M. R. Campbell, P. J. White, and L. M. Pollak, "Dosage Effect at the Sugary–2 Locus on Maize Starch Structure and Function", Cereal Chemistry 71 (1994) 464–468.

Y. Takeda and J. Preiss, "Structure of B90 (sugary) and W64A (normal) maize starches"–Carbohydrate Research 240 (1993) 265–275.

N. Inouchi, D. V. Glover, H. Fuwa, "Chain Length Distribution of Amylopectins of Several Single Mutants and the Normal Counterpart, and Sugary–1 Phytoglycogen in Maize"–Starke 39 (1987) 259–266.

N. Inouchi, D. V. Glover, Y. Sugimoto and H. Fuwa, "Some Structural Characteristics of Starches of Maize Having a Specific Genetic Background", Starke 33 (1981) 9–13.

N. Inouchi, D. V. Glover, T. Takaya and H. Fuwa, "Development Changes in Fine Structure of Starches of Several Endosperm Mutants of Maize", Starke 35 (1983) 371–376.

Primary Examiner—Jeanette Hunter
Attorney, Agent, or Firm—Lucas & Just

[57] ABSTRACT

Su2 starch produces gels that set firmer and faster than conventional starch gels to include the so-called high amylose starches. Su2 starch also can be used in foodstuff to replace high amylose starch and thin-thick chemically modified starch.

27 Claims, 3 Drawing Sheets

FOODSTUFFS CONTAINING SUGARY-2 STARCH

This invention relates to starch which has been extracted from a plant having a homozygous sugary-2 genotype (su2 starch) and, more particularly, to the use of su2 starch in foodstuffs.

Starch is a polymer of anhydroglucose which is produced by different plants and is generally categorized according to the plant source. For example, cereal starches are extracted from cereal grains such as maize, rice, wheat, barley, oats and sorghum; tuber and root starches from plants such as potato, sweet potato, arrowroot, yams and cassava; and waxy starches from plants such as waxy maize, waxy rice, waxy barley, and waxy sorghum.

Conventionally, starch was thought to consist of two polymers, amylose and amylopectin. Amylose was defined as a nearly linear polymer of anhydroglucose linked by alpha 1→4 linkages; and amylopectin as linear chains of alpha 1→4 linked anhydroglucose with occasional alpha 1→6 linkages connecting two linear chains of alpha 1→4 linked anhydroglucose. In amylopectin, the alpha 1→4 linked chain extending from an alpha 1→6 linkage is typically referred to as a branch. In a plant, the amylose and amylopectin polymers are organized to form a characteristic granule. The exact organization of the granular is not completely understood.

It is known that each starch-bearing plant produces a distinct range of polymer compositions and morphologically distinct granules. These differences produce markedly different properties in the starches.

There exists a number of recessive mutant genes which control starch synthesis in plants and which influence the properties of the starch. By controlled breeding, the expression of these mutants can be directed.

It is also well-known that certain starches possess a higher ability to bind iodine than other types of starch and that starches which have a higher ability to bind iodine also possess functionalities not found in other starch types, namely the ability to form firm gels and films.

It has now been discovered that starch extracted from a plant having a homozygous sugary-2 genotype (su2 starch) produces a gel having a higher strength and a faster set than conventional starches. The fact that su2 starch has a lower gelatinization temperature than conventional starches, coupled with the fast, firm gel obtained with su2 starch, makes su2 starch an ideal ingredient for use as a thickening agent in a foodstuff. Su2 starch functions as a thickening agent in a variety of foodstuffs, for example, pie fillings, starch jelly candies, soups, sauces, breadings, batters, and snack foods. The low gelatinization temperature and high gel strength also makes su2 starch a good replacement for conventional high amylose starches.

It has further been discovered that su2 starch has attributes similar to chemically modified starches used in canning, making su2 starch ideal for use as a thin-thick canning starch.

Figure 2:
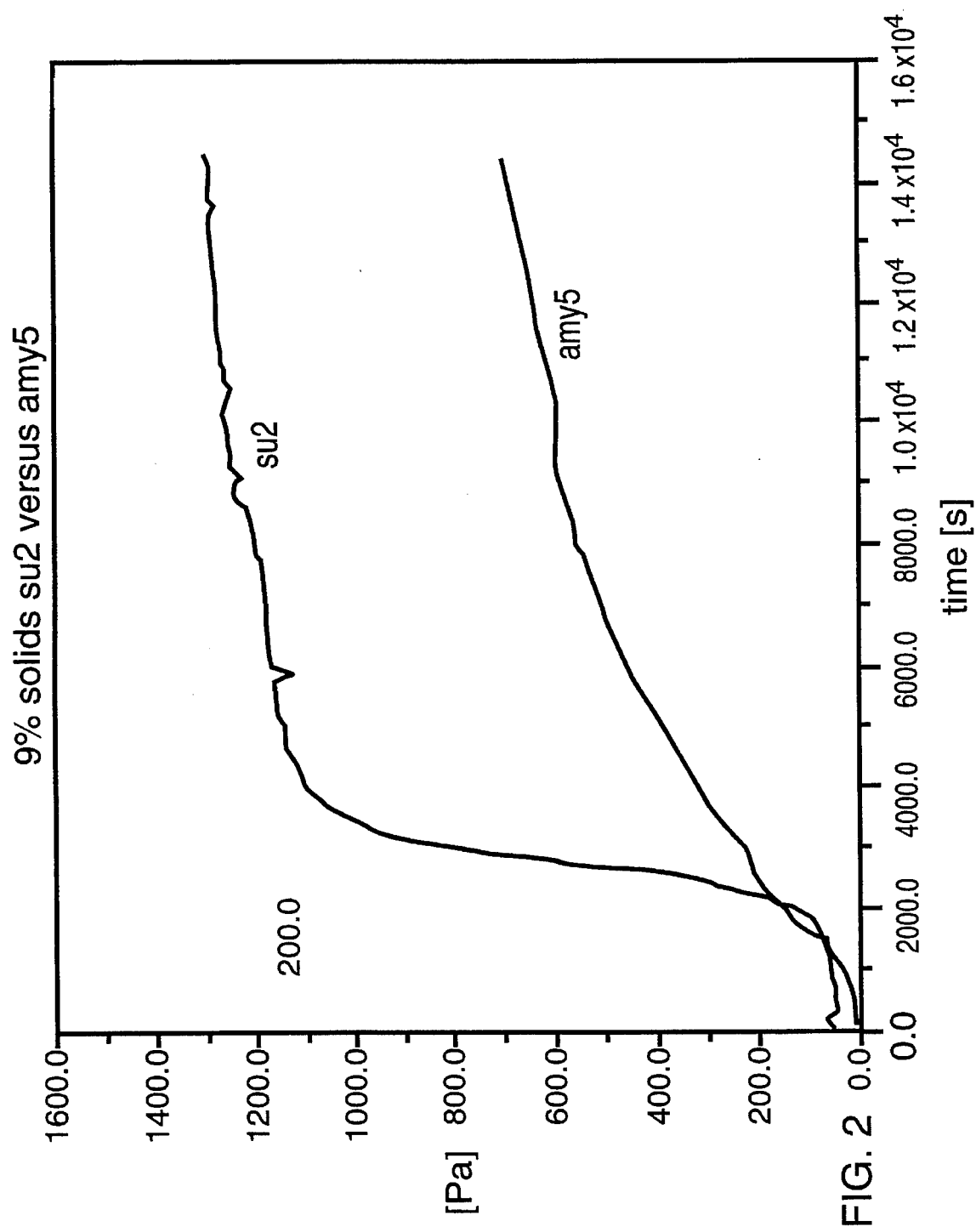
Figure 3:
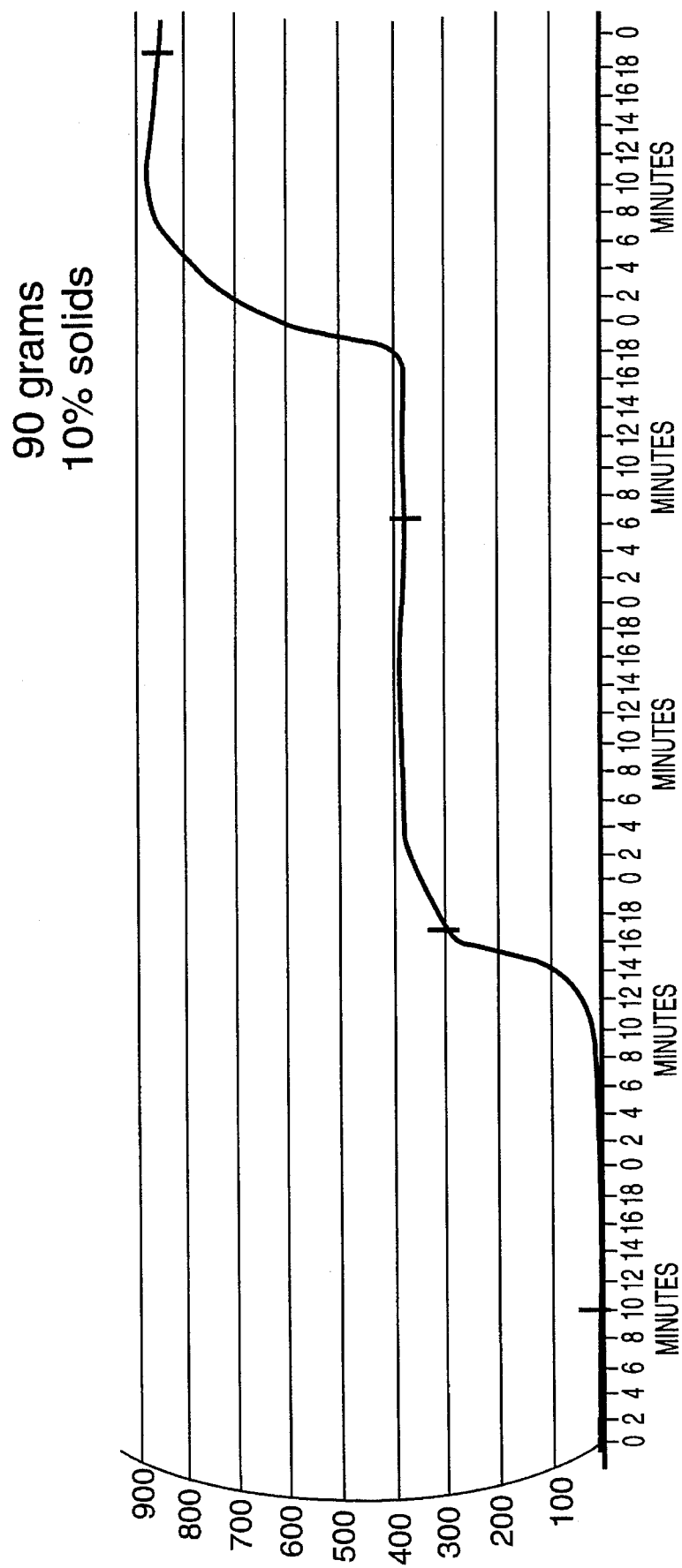

FIGS. 1 and 2 illustrate a gel curve of su2 starch at various solids levels compared to a conventional high amylose starch; and FIG. 3 illustrates the thin-thick characteristics of su2 starch.

It is quite unexpected to find that su2 starch possesses both a lower gelatinization temperature and produces a gel with a firmer, faster set than conventional starches. The gel characteristics, speed of set and strength of gel, coupled with the low gelatinization temperature, makes su2 starch an excellent thickening component for use in a foodstuff.

In order to employ su2 starch as a thickening component in a foodstuff, su2 starch is added to the foodstuff in an amount effective to provide thickening characteristics to the foodstuff. More specifically, the su2 starch is added to the foodstuff in an amount of about 1% to about 20% by weight foodstuff. The su2 starch can be employed either by adding su2 starch directly to the foodstuff or by adding a slurry or a sol containing su2 starch to the foodstuff.

It has been found that a sol comprising water and an effective amount of starch extracted from a plant of a su2 genotype exhibits thickening characteristics which makes the sol a good commercial thickener composition. The sol is prepared by forming a slurry of water and an effective amount of su2 starch and subsequently cooking the slurry thereby forming a paste. Preferably, the sol contains su2 starch in an amount of about 1 to about 20% by weight sol.

Cooking generally comprises raising the temperature of an aqueous slurry of the su2 starch to the gelatinization temperature of su2 starch and subjecting the starch to shear such that the starch granules rupture and form a paste. It is not necessary that all the granules rupture. Good results can be obtained by cooking at a temperature of about 60° C. and above and at a pH of about 8 to about 3 to provide thickening characteristics prior to adding the sol to the foodstuff. Cooking time is about 10 minutes. The sol in accordance with the present invention need not be cooked if the starch has already been subjected to a process which makes it cold water swellable.

In order to prepare the thickened foodstuff with a sol made in accordance with the present invention, the sol is combined with a foodstuff and the composition is cooked to the necessary degree to provide a thickened foodstuff. Conventional mixing is employed to combine the sol with the foodstuff. Cooking of the foodstuff composition is also carried out in a conventional manner.

The slurry is prepared in the same manner as outlined above for the sol except the slurry is not cooked prior to addition to the foodstuff.

In order to prepare a thickened foodstuff with su2 starch itself or a slurry containing su2 starch, the su2 starch is mixed with the foodstuff or a slurry comprising su2 starch and water is mixed with a foodstuff and the resulting mixture is cooked to the desired degree to obtain a thickened foodstuff.

When the starch itself or a slurry containing the starch itself is mixed with a foodstuff, the resulting mixture must be cooked in order to provide a thickened foodstuff. The mixing as well as the cooking is accomplished in a conventional manner. Cooking is carried out at a temperature of about 60° C. and above and at a pH of about 8 to about 3. Cooking time is about 10 minutes but may vary depending on the amount of foodstuff present and the amount of shear that the mix is subject to during cooking.

It is well-known that starches which possess an ability to form firm gels and films also possess a high ability to bind iodine. Conventionally, starches which had a high ability to bind iodine were referred to as high amylose starches, i.e. starches having an amylose content above about 50% by weight as determined by an iodine assay method.

Conventionally, the amount of amylose and amylopectin in a starch granule was determined by an iodine binding test. The iodine test was thought to determine the amount of amylose. The amount of amylopectin was determined by presuming that the portion of starch that was not amylose was amylopectin. Thus, there was no direct assay method for amylopectin.

Using conventional iodine binding techniques, it has been found that su2 starches have an apparent amylose content of about 40%.

Since the strength of a gel had been thought to be proportional to the amylose content, it is surprising and unexpected that su2 starch with a lower amylose content than conventional high amylose starches produces a firmer gel than these conventional high amylose starches. This means that su2 starch can be used as a replacement for conventional high amylose starches to provide the same gel strength while providing a cost savings to the user due to the lower gelatinization temperature and the need to use less su2 starch to obtain the same gel strength as a conventional high amylose starch.

More specifically, it has been found that su2 starch can be used in a foodstuff to replace conventional high amylose starch while reducing the energy necessary to gelatinize the starch. In order to replace conventional high amylose starch in a foodstuff with a su2 starch, su2 starch itself, a sol or a slurry of su2 starch is used in the foodstuff to replace the high amylose starch.

In order to replace high amylose starch with su2 starch, a replacement ratio of about 1:1 conventional high amylose starch:su2 starch is employed. Larger or smaller amounts of the su2 starch may be employed, however, as a general rule, a smaller amount of su2 starch than conventional high amylose starch is necessary to obtain the same gel characateristics.

Conventional high amylose starches have a gelatinization range greater than 80° C. and must be cooked with special equipment which allow higher temperatures and pressures to be used in processing. It is not uncommon for the high temperatures to cause deleterious "off flavors" in the starch.

The discovery that su2 starch with a gelatinization temperature below that of conventional high amylose starch produces firmer gels than conventional high amylose starch yields a cost savings to the user not only because of the lower temperatures necessary to cook the starch, but also because of the absence of special equipment.

Additionally, because of the rapid rate of gel formation of su2 starch, there is an improvement in functionality in many applications where the gel strength, the rate of gel formation, and film formation is the desired functionality; thus providing an economic advantage to the user. These applications include the manufacture of gum-type candies, batters, breadings, and fat mimetics.

It has also been unexpectedly found that su2 starch possesses viscosity characteristics similar to conventional thin-thick starches. Conventional thin-thick starches are typically chemically modified starches, not native starches. In the canning process, thin-thick starches are mixed with the foodstuff and the foodstuff is then subjected to a heat sterilization process. The name thin-thick is given to these starches because of their viscosity behavior, low or thin viscosity initially to allow rapid heat penetration to facilitate sterilization, increased or thick viscosity after sterilization to add body to the canned foodstuff. The term canning as used in the specification and claims means the act of preserving by heat whether the heat is applied before or after the packaging of the food and regardless of the form of the package. Canning includes, for example, pouch packaging, canning, aseptic pack, and retorting. Generally, thin-thick starches are chemically modified such as by hydroxypropylation to a specific degree of substitution and then crosslinked to a specific level. A thin-thick starch specifically developed for retorting is taught in U.S. Pat. No. 4,120,983 issued Oct. 17, 1978 to del Valle et al. The starch taught by the '983 patent is a hydroxypropylated, epichlorohydrin crosslinked tapioca and corn starch derivative.

The discovery that su2 starch can replace these so-called thin-thick modified starches provides economic advantages to the user.

Su2 starch is employed as a thin-thick starch in canning by mixing the starch, a slurry or a sol containing the same with a foodstuff suitable for canning. Generally, water is included in this mixture. Conventionally, the pH of such a mixture is adjusted, the mixture subsequently sealed in a container and the container subjected to a conventional canning process. During such canning process, the contents of the container preferably reaches above about 105° C. for a period of about 5 to about 25 minutes thereby sterilizing the contents of the sealed container. The amount of su2 starch employed for such a canning process is an effective amount. Preferably, su2 is employed in an amount of about 1 to about 20% by weight based on the total weight of the container content. Su2 starch, a slurry or a sol containing the same is conventionally mixed with the foodstuff.

Su2 starch having a protein content greater than or equal to about 1.0% by weight dry starch can be used as a breaded batter coating to foodstuffs that are subjected to deep fat frying and then served immediately after frying; or foodstuffs that are prefried, frozen and then reheated after freezing such as by refrying, heating in a conventional oven or heating in a microwave oven.

Su2 starch can be used to advantage whenever it is desired to coat a foodstuff with a breading mix. The term "breading mix" will be understood by those skilled in the art to mean any mix which is applied to foodstuffs before deep fat frying. Such mixes include bread crumbs, cookie crumbs, cracker crumbs and the like, either alone or mixed with butter, salt, seasoning, etc.

Broadly, a batter mix made in accordance with the present invention comprises water and an effective amount of su2 starch having a protein content of greater than or equal to about 1.0% by weight dry starch. Preferably, enough batter starch of the present invention is combined with water to produce a batter mix with a solids content between about 25 to about 50% by weight.

The protein used to adjust the protein content of the su2 starch can be of either animal or vegetable origin. As a general rule, however, it is preferred to use a protein derived from the same material as the starch, e.g. add corn protein (corn gluten) to corn starch. Normal commercial starches have a protein level of approximately 0.2 to 0.6% and it is necessary to adjust this level to greater than or equal to about 1.0% protein by weight dry starch. This adjustment in the protein level of the starch can be made by any suitable method. One suitable method is the simple addition of protein. A second suitable method to adjust the protein content is to combine a starch with a high protein content with one which has a low protein content such that the resulting mixture has the desired protein level. A third method especially applicable to corn starch is simply to reduce the amount of gluten that is normally removed during the extraction process of starch from corn kernels.

The protein content of starch is increased to greater than or equal to about 1.0% by weight dry starch. Preferably the protein level in the starch is increased to between about 1.0 to about 11% by weight based on dry starch. More preferably, the protein content is adjusted to about 1 to about 2% by weight dry starch.

Preferably, gluten is added to adjust the protein content to greater than or equal to about 1.0% by weight dry starch. More preferably, about 1.0 to about 5% by weight dry starch of gluten is added. Good results have been obtained by adding about 1% by weight dry starch of corn gluten to adjust the protein content of the starch. The protein content of a starch is suitably measured in accordance with The Standard Analytical Method B-48 Corn Refiners Association Standard Nov. 26, 1956, Revised Jun. 25, 1980.

The batter mix of the present invention is prepared by combining water and the su2 starch. Preferably, the foodstuff is dusted with the su2 starch prior to coating the foodstuff with the batter mix.

The term starch as used in the specification and claims means not only the substantially pure starch granules as extracted from a starch bearing plant but also grain products of the starch bearing plant such as flour, grit, hominy, and meal.

The term sugary-2 or su2 means not only the su2 homozygous genotype obtained by standard plant breeding techniques, but also the su2 genotype which has been moved to another portion of the plant genome by translocation, inversion, or any other method of chromosome engineering to include variations thereof whereby the disclosed properties of the present invention are obtained. Sugary-2 starch or su2 starch means starch obtained from a starch bearing plant that has the su2 homozygous genotype.

Any plant source which produces edible starch and which can be crossed to produce a plant having the su2 homozygous genotype may be used. Maize is the preferred plant. Hybrids are preferred because of their improved starch yields compared to inbred lines. The method of crossing plants and of obtaining specific genotypes as well as breeding to obtain hybrid vigor is well-known.

Extraction of starch is well-known. It typically entails a milling process. In accordance with the present invention, a wet milling process is used to extract the corn starch from the corn kernels. Corn wet milling comprises the steps of steeping and grinding the corn kernel and then separating the starch from the other components of the kernel. Prior to steeping, the kernels are subjected to a cleaning process to remove any debris which may be present. This cleaning process is usually done at the wet milling plant. The kernels are then steeped in a steep tank where the kernels are contacted with a countercurrent flow of water at an elevated temperature of 50° C. and containing 0.1 to 0.2% sulfur dioxide by weight. The kernels are maintained in the steep tank for about 24 to 48 hours. Next, the kernels are dewatered and subject to a first set of attrition mills.

The first set of mills generally grind and rupture the kernels, causing the germ to be released from the rest of the kernel. A typical attrition type mill used in commercial wet milling process is sold under the commercial name Bauer. The released germ is then separated from the other parts of the kernel by centrifugation. Throughout the grinding steps of the wet milling process the kernel and the kernel components are maintained in a slurry.

The remaining kernel components, which include starch, hull, fiber, and gluten, are subjected to a second set of attrition type mills such as the Bauer Mill, to grind further the components and separate the hull and fiber from the starch and gluten. Hull and fiber are generally referred to as bran. Washing screens are used to separate the bran from the starch and gluten. The starch and gluten pass throughout the screens while the bran does not.

Next, the starch is separated from the protein. This step is done by centrifugation or by a third grind followed by centrifugation. A commercial separator suitable for the present process is the Merco centrifugal separator.

The slurry which contains the starch granules is then dewatered and the resulting granules washed with fresh water and dried in a conventional manner, preferably to about 12% moisture.

The substantially pure starch from a starch bearing plant having the su2 genotype is obtained in this manner.

Alternatively, the starch may be left in suspension and subjected to further modification.

The su2 starch can also be subjected to one or more of the conventionally recognized treatments which modify the starch either physically, chemically or both. These treatments include bleaching, thin boiling, acid treatment, enzyme treatment, dextrinization or dry roasting, etherification, esterification, and crosslinking. Starches which have been treated by any one or more of these eight treatments listed above are conventionally referred to as chemically modified starch.

Bleaching, often referred to as oxidation, is a modification which does not appreciably alter the granular structure of the starch. Oxidation does, however, tend to lighten the color of the granules and reduce the viscosity of the starch paste.

In order to bleach the starch of the present invention, a slurry of starch is prepared of about 5 to about 40% by weight starch. To the slurry sodium hypochlorite is added with about 6% available chlorine (free chlorine) and the slurry is held at about 45° C. for between about 1 to about 20 hours. The slurry is then neutralized with sodium bisulphite and the resulting granules are dewatered, washed and dried in conventional manner.

In order to produce a thin boiled starch of the present invention, a slurry of starch is prepared of about 5 to about 40% by weight starch. To this slurry, a mineral acid is added and allowed to react with the starch for about 1 to about 100 hours at about 30° to about 50° C. with constant agitation. Such a reaction is done below the gelatinization temperature of the starch. Subsequently, the solution is neutralized, dewatered, washed and dried in conventional manner.

Thin boiling leaves the granules intact and produces a starch product which has a slight reduced viscosity compared to the non-thin boiled starch. If partial or total destruction of the starch granule is sought, the granule may be subjected to acid treatment.

In order to acid treat the starch of the present invention, a slurry of starch about 5 to about 40% by weight starch is prepared. This slurry is reacted with acid, generally a strong acid, at a temperature above the gelatinization temperature. Such a procedure is preferably carried out by jet cooking the slurry through a conventional jet cooker with or without acid already in the slurry and then allowing the slurry to react with the acid, adding acid if needed, for a desired period of time or until the desired dextrose equivalent (DE) is reached. The DE is roughly proportional to the length of time for the reaction. Generally, such jet cooking destroys the starch's granular structure.

After acid treatment, the resulting slurry is neutralized, dewatered and dried. Such product may also be subject to conventional carbon treatment and filtration prior to dewatering and drying. Another treatment which degrades the granular structure is enzyme treatment.

In order to enzyme treat the starch of the present invention, a slurry of starch is made up having about 5 to about 40% by weight starch. To this slurry, enzyme is added at the optimum pH and temperature for the enzyme. Some advantage is found by first jet cooking the slurry to open up the starch granules, cooling the slurry to optimum temperature for the enzyme and then adding the enzyme. If the enzyme is jet cook stable then the enzyme can be added to the slurry prior to jet cooking. The slurry may also be treated with acid first to a low DE and then enzyme treated. After enzyme treatment, the product is dewatered and dried. Alternatively, the product may be subject to conventional carbon bleaching and filtration prior to concentration and/or drying.

In order to dextrinize or dry roast the starch of the present invention, acid is added to dry starch granules and the mixture is heated to a temperature of about 120° to about 175° C. for about 3 to about 72 hours. The product, once removed from the heat, is sold as is. The preferred acids are hydrochloric, phosphoric and any mineral acid. Such a method causes the partial breakdown of the granular structure.

In order to etherify the starch of the present invention, a slurry of starch is made up having about 5 to about 40% by weight starch. The pH of the slurry is adjusted to about 10 to about 12 preferably with sodium hydroxide. Next, an etherification agent such as ethylene oxide or propylene oxide is added to the slurry in an amount of about ½ to about 25% depending on the desired degree of substitution. The reaction conditions are held for about 5 to about 30 hours at about 30° to about 50° C. The slurry is then neutralized with any known acid, dewatered, washed and dried.

In order to crosslink the starch of the present invention, a slurry of starch is made up of about 5 to about 40% by weight starch. The pH of the slurry is adjusted to about 8 to about 12 preferably with sodium hydroxide. Optionally, a salt may be added to the slurry to affect swelling of the granules. Then the slurry is reacted with a crosslinking agent such as phosphorous oxychloride, trimetaphosphate salt, or epichlorohydrin at about 20° to about 50° C. for about ½ to about 5 hours. The length of time of the reaction will depend on the amount of crosslinking agent used and the specific crosslinking agent chosen.

In order to esterify the starch of the present invention, a slurry of starch is prepared having about 5 to about 40% by weight starch. The pH of the slurry is then adjusted to about 8 to about 10 and an esterification agent is added to the slurry such as vinyl ester, acetyl halites, acid anhydrides like acetic anhydride, or succinic anhydride. The esterification agent is added slowly while maintaining the pH of the slurry. The reaction is continued for about ½ to about 5 hours at about 25° to about 50° C. Once the reaction is completed to the desired degree of substitution, the slurry is neutralized, dewatered, washed and dried.

Any combination of these modifications may be employed on starch of the present invention.

These and other aspects of the present invention may be more fully understood by reference to the following examples:

EXAMPLE 1

This example compares conventional high amylose starch to a su2 starch for both the firmness of a paste and the rate of formation of a gel.

In order to compare the two starches, samples of the starches were slurried at 5% solids and 9% solids, and rapidly heated to 62° C. in the cup of the Visco-amylograph. A controlled heating rate of 1.5° C./min was used until the paste reached 95° C. Upon reaching this temperature, the paste was held at this temperature for 30 minutes. The conventional high amylose starches could not be pasted in Visco-amylograph. Instead, a jet cooker was employed. Otherwise, the test procedures were identical.

When pasting was complete, the hot paste for each sample was rapidly transferred to a rheometrics RFS2 rheometer, where a gel cure experiment was performed. The sample was cooled at a constant rate and then held at 25° C. for a total of 4 hours.

The gel cure experiment measured the storage modulus (G') of the sample as the material cured. The cure experiment measured the change of state from a viscoelastic liquid to a viscoelastic gel. This was achieved by applying small non-destructive strains to the sample. G' was correlated with gel firmness and reflected the relative strength and number of molecular associations in the sample. Thus, an increase in gel firmness (G') is a measure of the rate of gel formation (Ross-Murphy). This technique allows measurement of gel formation and the rate of gel formation while the molecular associations are forming without destroying or altering the structure.

The results from this test are reported in FIGS. 1 and 2. The curve for su2 starch is labelled su2 while the curve for the conventional high amylose starch was labelled Amy 5. FIG. 1 reports the data for tests on samples at 5% solids, while FIG. 2 reports the data for tests on samples at 9% solids. Su2 starch clearly developed G' (gel firmness) more quickly than conventional high amylose starches and had a higher gel strength than conventional high amylose starch.

Microscopic observation showed that less than 2% of the granules were birefringent after pasting for all samples. All the granules were fully cooked out, most had collapsed. Thus, su2 starch is fully pasted and forms rapid, firm gels when compared to conventional high amylose starches.

EXAMPLE 2

This example illustrates the high iodine binding and low gelatinization temperature of su2 starch compared to conventional high amylose starches and common corn starch. The results of this example are listed in Table 1 below.

TABLE I

| Starch | Iodine Binding Ability % | Peak Gelatinization Temperature(DSC) °C. |
|---|---|---|
| 1. Amy 5 | 58 | 78.6 |
| 2. Amy 7 | 69 | 80.0 |
| 3. Su2 starch | 43 | 62.0 |
| 4. Common corn starch | 25 | 72.0 |

Amy 5 and Amy 7 are conventional high amylose starches sold by American Maize-Products Company of Hammond, Ind. Su2 starch was the starch of the present invention while common corn starch was a conventional common starch obtained from maize.

Table 1 clearly demonstrates that the su2 starch possesses an elevated ability to bind iodine, when compared to common corn starch and a significantly lower temperature of gelatinization than the other starches.

The percent amylose was determined using standard colorimetric iodine procedures wherein the starch is first gelatinized with sodium hydroxide and then reacted with an iodine solution and the resulting sample measured using a spectrophotometer in a 1 cm cell at 600 nm against a blank of 2% iodine solution.

The DSC gelatinization temperature was measured using a scanning calorimeter manufactured by Mettler Model No. 300 using a 30% solid starch following the procedure outlined in the owner's manual for that model.

EXAMPLE 3

This example illustrates the thin-thick attributes of su2 starch. FIG. 3 illustrates the general graph of viscosity over time while subjecting a sample of su2 starch to a specific temperature profile which simulates retort conditions.

In order to obtain the curve of FIG. 3, a Brabender amylograph was run at 10% solids using a 90 gram sample of su2 starch with 125 gram cartridge at 100 RPM. The exact procedure used is outlined in the Amylograph Handbook of the American Association of Cereal Chemists, 1982 Edition at pages 17 and 18. The respective paddle for the 90 gram cup was used for this test. The sample was subjected to a temperature profile which comprised rapidly heating the sample to 95° C., maintaining the sample at 95° C. for a period of time, cooling the sample to 50° C., and maintaining the sample at 50° C. for a period of time. Throughout this heating and cooling cycle, the sample is measured for viscosity. FIG. 3 has been labelled to correspond to this temperature profile. More specifically, the initial temperature of the sample was room temperature (22° C.). The Brabender machine was set for rapid heat mode to heat the sample to 50° C. and the test was started. Once 50° C. was reached, the instrument was set at a controlled rate of heating, 1½° C./minute, until a temperature of 95° C. was reached. The sample was then held at 95° C. for 30 minutes. Next, the sample was cooled at 1½° C./minute to a temperature of 50° C. The sample was then held at 50° C. for 30 minutes.

Brabender curves are a well-known tool for determining characteristics of starch and Table II lists a number of the key points on FIG. 3 which was a typical curve for su2 starch.

TABLE II

|  | Brabender |
| --- | --- |
| Initial Rise | 74° C. |
| Heating Peak | 400 Bu |
| Heating Final | 400 Bu |
| Cooling Peak | 875 Bu |
| Cooling Final | 875 Bu |

Initial Rise was the temperature at which the pen first moves away from the baseline. Heating Peak was the highest viscosity obtained during the heating cycle. Heating Final was the last viscosity reading at the end of the heating cycle. The highest viscosity reading during the cooling cycle was labelled Cooling Peak, while Cooling Final was the viscosity of the sample at the end of the cooling cycle.

The amylograph of su2 starch has a characteristic curve for thin-thick starches, little or no viscosity development during the initial heating to allow for good heat penetration into the contents of the can and viscosity development during cooling to allow for thickening of the can contents after sterilization.

EXAMPLE 4

This example illustrates preparing a thickener composition in accordance with the present invention. Su2 starch is mixed with water in an amount to produce a slurry having 10% by weight starch. The slurry is then cooked at about 90° C. for 10 minutes producing a thickener composition which can be used in foodstuffs.

EXAMPLE 5

This example illustrates using su2 starch as a thickening component for preparing a lemon pie filling.

The following ingredients and procedure are used:

TABLE III

| Ingredients | Percent by Weight Present Invention |
| --- | --- |
| Water | 62.94 |
| Sugar | 19.30 |
| Maltodextrin | 6.67 |
| Su2 Starch | 4.50 |
| Corn Syrup Solids | 2.50 |
| Lemon Juice | 2.50 |
| Vegetable Shortening | 1.03 |
| Salt | 0.23 |
| Citric Acid | 0.20 |
| Emulsifier | 0.10 |
| Lemon Oil (2x) | 0.03 |
|  | 100.00 |

Half of the water is combined with the sugar and brought to a boil. All of the remaining ingredients are slurried together and then added to the boiling sugar and water. The temperature of this mixture is then adjusted to 95° C. and held there for two minutes. The mixture is then poured into prepared pie crusts and allowed to cool and solidify.

EXAMPLE 6

This example illustrates the use of su2 starch as a replacement for a conventional high amylose starch. In this example, a starch jelly candy made with su2 starch is compared to a starch jelly candy made with a conventional high amylose starch.

TABLE IV

|  | Amount (% by Weight) | |
| --- | --- | --- |
| Ingredients | Present Invention | Conventional |
| Corn Syrup | 45 | 44.9 |
| Sugar (sucrose) | 31 | 32.0 |
| 90 Thin-boiled Starch (from common corn) | 6.0 | 7.4 |
| su2 Starch | 2.7 | 0 |
| Conventional High Amylose Starch | 0 | 3.1 |
| Water | 12.0 | 12.4 |

The starch jelly candy containing su2 starch is made by combining all the ingredients in a heated vessel, and thoroughly mixing all the ingredients until the mixture is brought to 45° C. Then, the heated mixture is pumped through a continuous cooker (jet cooked) at 130° C. The cooked material is collected and deposited into starch molds. When the depositing is completed the starch molds are stored in a heated room at 45°–50° C. until the starch jelly formulation sets. After the set is completed the starch jellies are able to be demolded for additional processing. The conventional starch jelly candy is made in a manner similar to the starch jelly candy of the present invention except a jet temperature of 160° C. is required.

The organoleptic characteristics such as taste, mouth feel, body and texture, as well as the water retention characteristics, of the starch jellies made with su2 starch are substantially similar to the starch jelly candies made with conventional high amylose starch.

EXAMPLE 7

This example illustrates using su2 starch in canning.

A medium is prepared by mixing 8% su2 starch with 58% water, 0.5% salt, 18.5% corn syrup and 15% sugar. The pH of the system is adjusted with citric acid to about 3.5. This medium is then mixed with blueberries to obtain a final mixture that contains about 50–60% by weight mixed blueberries. The final mixture is placed in a container and sealed. The sealed container is then subjected to a retort process.

EXAMPLE 8

This example illustrates using su2 starch in a batter. A fillet of fish weighing approximately 120 grams is prepared by first dusting the fish with su2 starch and then thoroughly dipping the dusted fillet into a batter mix of 40% solids made of water and su2 starch. The battered fillet is then drained and breaded with a breading mix. The starch used for both dusting the fillet and in the batter mix has a gluten content of about 1%.

The breaded fillet is then deep fat fried in vegetable oil at 190° C. for 3½ minutes. The fillet is then cooled to 60° C. In this manner su2 starch is used in a batter mix.

It will be understood that the claims are intended to cover all changes and modifications of the preferred embodiments of the invention herein chosen for the purpose of illustration which do not constitute a departure from the spirit and scope of the invention.

What is claimed is:

1. A thickened foodstuff comprising a foodstuff, water and having as an essential ingredient therein an effective amount of a starch extracted from a starch bearing plant having a su2 genotype, said starch being present in said foodstuff in an amount effective to thicken said foodstuff at a faster rate than conventional high amylose starch and providing said foodstuff with a paste that has a stronger gel strength than a paste made from a conventional high amylose starch.

2. The thickened foodstuff of claim 1 wherein the starch bearing plant is maize and the starch is extracted from kernels of maize.

3. The thickened foodstuff of claim 1 wherein the amount of starch present is about 1% to about 20% by weight based on the total weight of thickened foodstuff.

4. The thickened foodstuff of claim 3 wherein the starch bearing plant is maize and the starch is extracted from kernels of maize.

5. A method for making a thickened foodstuff comprising combining a foodstuff, water and an effective amount of a starch extracted from a starch bearing plant having a su2 genotype, said starch being present in said foodstuff in an amount effective to thicken said foodstuff at a faster rate than conventional high amylose starch and providing said foodstuff with a paste that has a stronger gel strength than a paste made from a conventional high amylose starch; and cooking said combination to produce a thickened foodstuff.

6. The method of claim 5 wherein the starch is extracted from a maize kernel.

7. The method of claim 6 wherein the water and starch are combined together first and then subsequently combined with the foodstuff.

8. The method of claim 6 wherein the amount of starch added is about 1% to about 20% by weight based on the total weight of foodstuff.

9. The method of claim 6 wherein the starch is in granular form.

10. A method for making a thickened foodstuff comprising:

(a) forming a slurry comprising water and a starch extracted from a starch bearing plant having a su2 genotype in an amount of about 1 to about 20% by weight;

(b) cooking the slurry as necessary to produce a sol; and (c) combining the sol with a foodstuff to produce a thickened foodstuff such that said starch is present in said foodstuff in an amount effective to thicken said foodstuff at a faster rate than conventional high amylose starch and providing said foodstuff with a paste that has a stronger gel strength than a paste made from a conventional high amylose starch.

11. The method of claim 10 wherein the cooking step is conducted at a temperature equal to or greater than the gelatinization temperature of the starch.

12. The method of claim 9 wherein the plant is maize.

13. The method of claim 12 wherein the amount of starch added is about 1% to about 20% by weight based on the total weight of foodstuff.

14. A process for replacing conventional high amylose starches in a foodstuff and reducing the temperature used for cooking said conventional high amylose starch comprising the step of replacing said conventional high amylose starch with a starch extracted from a starch bearing plant having a su2 genotype, in an amount of about less than or equal to the amount of said conventional high amylose starch used in said foodstuff, said starch extracted from the starch bearing plant having a su2 genotype having a lower gelatinization temperature than conventional high amylose starches.

15. The process of claim 12 wherein said starch bearing plant is maize and said starch is extracted from kernels of maize.

16. A thickened foodstuff for canning comprising a foodstuff, water and having as an essential ingredient therein an effective amount of a natural thin-thick starch, said starch extracted from a starch bearing plant having a su2 genotype, said starch providing no effective thickening characteristics to said foodstuff before canning while providing effective thickening characteristics to said foodstuff after canning.

17. The thickened foodstuff of claim 16 wherein the starch bearing plant is maize and the starch is extracted from kernels of maize.

18. The thickened foodstuff of claim 16 wherein the amount of starch present is about 1% to about 20% by weight based on the total weight of thickened foodstuff.

19. A process for making a thickened canned foodstuff comprising combining a foodstuff, water and an effective amount of a natural thin-thick starchy, said starch extracted from a starch bearing plant having a su2 genotype; and subjecting said combination to a canning process whereby said starch provides no effective thickening characteristics to said foodstuff before canning while providing effective thickening characteristics to said foodstuff after canning.

20. The process of claim 19 wherein the starch is extracted from a maize kernel.

21. The method of claim 19 wherein the water and starch are combined together first and then subsequently combined with the foodstuff.

22. The method of claim 20 wherein the amount of starch added is about 1% to about 20% by weight based on total weight of foodstuff.

23. A batter mix for breaded deep fat fried foods comprising water and an effective amount of su2 starch, said starch having a protein content of greater than or equal to about 1% by weight dried starch.

24. The batter mix of claim 23 wherein the batter mix has a solids content of about 25% to about 50%.

25. The batter mix of claim 23 wherein the protein content is about 1.0 to about 11.0% by weight dry starch.

26. The batter mix of claim 23 wherein the su2 starch is obtained from maize.

27. The batter mix of claim 23 wherein corn gluten is added to the su2 starch to provide a protein content of about 1 to about 2% by weight dry starch.

* * * * *

UNITED STATES PATENT AND TRADEMARK OFFICE
CERTIFICATE OF CORRECTION

PATENT NO. : 5,476,674
DATED : December 19, 1995
INVENTOR(S) : Robert Friedman et al.

It is certified that error appears in the above-indentified patent and that said Letters Patent is hereby corrected as shown below:

Column 12, line 29 (claim 15), change the dependency from "claim 12" to --claim 14--.

Column 12, line 47 (claim 19), change "starchy" to --starch--.

Signed and Sealed this

Twelfth Day of March, 1996

Attest:

BRUCE LEHMAN

Attesting Officer

Commissioner of Patents and Trademarks